(12) United States Patent
Kurihara et al.

(10) Patent No.: US 10,087,945 B2
(45) Date of Patent: Oct. 2, 2018

(54) CENTRIFUGAL COMPRESSOR

(71) Applicant: IHI Corporation, Tokyo (JP)

(72) Inventors: Kazuaki Kurihara, Tokyo (JP); Nobuyoshi Sakuma, Tokyo (JP)

(73) Assignee: IHI CORPORATION (JP)

( * ) Notice: Subject to any disclaimer, the term of this patent is extended or adjusted under 35 U.S.C. 154(b) by 852 days.

(21) Appl. No.: 14/411,738

(22) PCT Filed: Aug. 28, 2013

(86) PCT No.: PCT/JP2013/073015
§ 371 (c)(1),
(2) Date: Dec. 29, 2014

(87) PCT Pub. No.: WO2014/034727
PCT Pub. Date: Mar. 6, 2014

(65) Prior Publication Data
US 2015/0167687 A1    Jun. 18, 2015

(30) Foreign Application Priority Data

Aug. 28, 2012  (JP) .................................. 2012-187743

(51) Int. Cl.
*F04D 29/058*  (2006.01)
*F04D 29/056*  (2006.01)
(Continued)

(52) U.S. Cl.
CPC ........... *F04D 29/056* (2013.01); *F01D 25/16* (2013.01); *F02C 7/06* (2013.01); *F04D 17/10* (2013.01);
(Continued)

(58) Field of Classification Search
CPC ........ F04D 29/056; F04D 17/10; F04D 17/12; F04D 25/0606; F04D 29/051; F04D 29/058; F04D 29/059; F01D 25/16; F02C 7/06; F16C 21/00; F16C 32/0442; F16C 32/0489; F16C 39/02; F16C 17/04; F16C 19/06;
(Continued)

(56) References Cited

U.S. PATENT DOCUMENTS 9,151,325 B2 * 10/2015 Hanaka ................. F01D 25/162
2011/0044832 A1   2/2011 Nijhuis ..................... 417/423.12

FOREIGN PATENT DOCUMENTS

CN    101326378 A    12/2008
JP    07-083193      3/1995
(Continued)

OTHER PUBLICATIONS

International Search Report and Written Opinion dated Nov. 26, 2013 in corresponding PCT International Application No. PCT/JP2013/073015.

*Primary Examiner* — Richard Edgar
(74) *Attorney, Agent, or Firm* — Ostrolenk Faber LLP (57) ABSTRACT

A centrifugal compressor (1) that includes: an auxiliary bearing (7) which supports a shaft (2), which is supported by a magnetic bearing (6), when the shaft (2) is displaced from a reference position; and a stopper (8) that is provided only for a first auxiliary bearing (7*a*) among the first auxiliary bearing (7*a*) and a second auxiliary bearing (7*b*), that is fixed to the shaft (2), and that restricts a movement of the shaft (2) in both directions in an axial direction by the stopper (8) being brought into contact with the first auxiliary bearing (7*a*).

5 Claims, 3 Drawing Sheets

(51) Int. Cl.
*F16C 39/02* (2006.01)
*F16C 21/00* (2006.01)
*F16C 32/04* (2006.01)
*F04D 29/051* (2006.01)
*F04D 29/059* (2006.01)
*F01D 25/16* (2006.01)
*F04D 17/12* (2006.01)
*F02C 7/06* (2006.01)
*F04D 25/06* (2006.01)
*F04D 17/10* (2006.01)
*F16C 35/073* (2006.01)
*F16C 17/04* (2006.01)
*F16C 19/06* (2006.01)
*F16C 19/26* (2006.01)
*F16C 19/54* (2006.01)

(52) U.S. Cl.
CPC ......... *F04D 17/12* (2013.01); *F04D 25/0606* (2013.01); *F04D 29/051* (2013.01); *F04D 29/058* (2013.01); *F04D 29/059* (2013.01); *F16C 21/00* (2013.01); *F16C 32/0442* (2013.01); *F16C 32/0489* (2013.01); *F16C 39/02* (2013.01); *F05D 2220/40* (2013.01); *F05D 2240/51* (2013.01); *F16C 17/04* (2013.01); *F16C 19/06* (2013.01); *F16C 19/26* (2013.01); *F16C 19/54* (2013.01); *F16C 19/543* (2013.01); *F16C 35/073* (2013.01); *F16C 2226/50* (2013.01); *F16C 2360/42* (2013.01); *F16C 2360/44* (2013.01); *F16C 2380/26* (2013.01)

(58) Field of Classification Search
CPC ........ F16C 19/26; F16C 19/54; F16C 19/543; F16C 35/073; F16C 2226/50; F16C 2360/42; F16C 2360/44; F16C 2380/26; F05D 2220/40; F05D 2240/51
See application file for complete search history.

(56) References Cited

FOREIGN PATENT DOCUMENTS

| | | | |
|---|---|---|---|
| JP | 08326751 A | * 12/1996 | .......... F16C 32/0442 |
| JP | 2002-95209 | 3/2002 | |
| JP | 2002-218708 | 8/2002 | |
| JP | 2004-060686 | 2/2004 | |
| JP | 2008-039228 | 2/2008 | |
| WO | WO 2011/011573 A1 | 1/2011 | |

* cited by examiner

FIG. 3B

CENTRIFUGAL COMPRESSOR

CROSS-REFERENCE TO RELATED APPLICATIONS

The present application is a 35 U.S.C. §§ 371 national phase conversion of PCT/JP2013/073015, filed Aug. 28, 2013, which claims priority to Japanese Patent Application No. 2012-187743, filed Aug. 28, 2012, the contents of which are incorporated herein by reference. The PCT International Application was published in the Japanese language.

TECHNICAL FIELD

The present invention relates to a centrifugal compressor.

BACKGROUND ART

In recent years, there are cases where a shaft of a centrifugal compressor is rotatably supported by magnetic bearings in order to achieve a high-speed revolution. With the shaft being supported by the magnetic bearings in this manner, no frictional heat is generated between the shaft and the bearings. Therefore, it is possible to prevent the shaft and the bearings from having galling due to frictional heat, and to rotate the shaft at high speed.

This type of magnetic bearing is not brought into direct contact with the shaft, and hence does not have a strength high enough to support the weight of the shaft. Therefore, for example if the shaft is unintentionally displaced from the reference position due to a power failure or an earthquake, to thereby be brought into contact with the magnetic bearing, the magnetic bearing may be damaged.

Therefore, the centrifugal compressor whose shaft is supported by the magnetic bearings is provided with auxiliary bearings which, when the shaft is displaced from the reference position, are brought into contact with the shaft to suppress a further displacement of the shaft. With these auxiliary bearings being provided, even if the shaft is displaced from the reference position from any cause, contact between the shaft and the magnetic bearing is prevented, and hence, the magnetic bearing is not damaged.

CITATION LIST

Patent Documents

Patent Document 1: Japanese Unexamined Patent Application, First Publication No. 2002-218708

SUMMARY OF INVENTION

Technical Problem

As for the aforementioned centrifugal compressor, it is required to prevent the shaft from moving in the axial direction as well even if, for example, power supply is stopped and the restriction by the magnetic bearings does not function. With the auxiliary bearings, it is possible to restrict the movement of the shaft in the radial direction but is not possible to restrict the movement of the shaft in the axial direction. To address this, one of the conceivable approaches is that: stoppers are fixed with respect to the shaft; and the stoppers are configured to be brought into contact with the auxiliary bearings when the shaft is about to move in the axial direction, to thereby restrict the movement of the shaft in the axial direction. As shown in Patent Document 1, the auxiliary bearing is provided in the vicinity of each end of the shaft. Therefore, for example by providing the stoppers such that the stopper is installed on an external side of each auxiliary bearing or on an internal side of each auxiliary bearing, it is possible to restrict the movement of the shaft even if the shaft is about to move in one of the axial directions.

On the other hand, in the centrifugal compressor, the shaft is rotated at extremely high speed. Consequently, due to the heat generation by the motor, the frictional heat between the impeller and the gas, or the like, the shaft and the like are heated to high temperatures. Therefore, during rotation, the shaft is extended in the axial direction. To minimize the movement of the shaft in the axial direction when the shaft is supported by the auxiliary bearing, it is desirable that the distance from the stopper, which is fixed to the shaft, to the auxiliary bearing be made as short as possible. Therefore, a conceivable approach is to set the positions of the stopper and the auxiliary bearing so that the distance between the stopper and the auxiliary bearing is minimized when the shaft is thermally extended.

However, the number of rotations of the shaft changes according to, for example, the discharge pressure of the centrifugal compressor. Furthermore, the amount of heat generation changes depending on the number of rotations of the shaft. Therefore, the amount of extension of the shaft changes according to the number of rotations of the shaft. Namely, if the number of rotations of the shaft is high, the amount of heat generation is large and the amount of extension of the shaft is large, and if the number of rotations of the shaft is low, the amount of heat generation is small and the amount of extension of the shaft is small. Therefore, if the stopper is installed on the external side of each auxiliary bearing or on the internal side of each auxiliary bearing, the distance from the stopper to the auxiliary bearing changes between the case of a large amount of extension of the shaft and the case of a small amount of extension of the shaft. For example, if the stopper is installed on the external side of each auxiliary bearing, the distance from the stopper to the auxiliary bearing is long when the amount of extension of the shaft is large, and the distance from the stopper to the auxiliary bearing is short when the amount of extension of the shaft is small. If the stopper is installed on the internal side of each auxiliary bearing, the distance from the stopper to the auxiliary bearing is short when the amount of extension of the shaft is large, and the distance from the stopper to the auxiliary bearing is long when the amount of extension of the shaft is large.

Thus, if the stopper is installed on the external side of each auxiliary bearing or on the internal side of each auxiliary bearing, it is not possible to uniquely set the positions of the stopper and the auxiliary bearing so that, when the shaft is thermally extended, the distance between the stopper and the auxiliary bearing is minimum. Therefore, there may be cases where, according to the number of rotation of the shaft, the distance from the stopper to the auxiliary bearing is long, making it impossible to sufficiently restrict the movement of the shaft in the axial direction when the shaft is supported by the auxiliary bearings. Furthermore, if the distance from the stopper to the auxiliary bearing is short at low temperatures, there may be cases where, although the magnetic bearings are functioning normally, the stopper is brought into contact with the auxiliary bearing when the amount of extension of the shaft is increased, resulting in an increase in rotational resistance of the shaft and also in a decrease in the lifespan of the auxiliary bearing.

The present invention has been achieved in view of the aforementioned problems, and has an object that, in a centrifugal compressor including an auxiliary bearing for supporting a shaft, which is supported by a magnetic bearing, when the shaft is displaced from a reference position, a movement of the shaft in the axial direction when the shaft is supported by the auxiliary bearing is securely restricted, and a contact between the stopper and the auxiliary bearing when the magnetic bearing is functioning properly is prevented.

Solution to Problem

To solve the above-mentioned problems, the present invention adopts the following.

A first aspect according to the present invention is a centrifugal compressor that includes: a shaft that is rotatably supported by a magnetic bearing; an impeller that is fixed to the shaft; and an auxiliary bearing that supports the shaft when the shaft is displaced from a reference position, the centrifugal compressor including: a first auxiliary bearing, as the auxiliary bearing, which is arranged on a side of a first end of the shaft; a second auxiliary bearing, as the auxiliary bearing, which is arranged on a side of a second end of the shaft; and a stopper that is provided only for the first auxiliary bearing among the first auxiliary bearing and the second auxiliary bearing, that is fixed to the shaft, and that restricts a movement of the shaft in both directions in an axial direction of the shaft by the stopper being brought into contact with the first auxiliary bearing.

A second aspect according to the present invention is that, in the first aspect, the magnetic bearing has an axial magnetic bearing that restricts a movement of the shaft in the axial direction of the shaft, the axial magnetic bearing being arranged at a position closer to the first auxiliary bearing than the second auxiliary bearing in the axial direction of the shaft A third aspect according to the present invention is that, in the first or second aspect, the impeller has: a low-pressure impeller; and a high-pressure impeller that further compresses gas compressed by the low-pressure impeller, and that the high-pressure impeller is fixed to the first end of the shaft, which is an end of the side on which the stopper is arranged.

A fourth aspect according to the present invention is that, in any one of the first to third aspects, each of the first auxiliary bearing and the second auxiliary bearing is a deep groove ball bearing.

A fifth aspect according to the present invention is that, in any one of the first to third aspects, the first auxiliary bearing is a double-row angular ball bearing that is made of two angular ball bearings arranged so that back surfaces or front surfaces of the two angular ball bearings face each other, and the second auxiliary bearing is a roller bearing.

A sixth aspect according to the present invention is that, in any one of the first to fifth aspects, the stopper has: a first ring member that has a first protrusion and is fitted onto the shaft, the first protrusion being arranged so as to face a side surface of the first auxiliary bearing on the side of the second end; and a second ring member that has a second protrusion and is fitted onto the shaft, the second protrusion being arranged so as to face a side surface of the first auxiliary bearing on the side of the first end.

Advantageous Effects of Invention

According to the present invention, the stopper that restricts the movement of the shaft in both directions in the axial direction by the stopper being brought into contact with the first auxiliary bearing is provided on the shaft, and the stopper is provided only for the first auxiliary bearing among the first auxiliary bearing and the second auxiliary bearing. Namely, in the present invention, a stopper that is brought into contact with the second auxiliary bearing is not provided. Therefore, with a base point of extension and contraction of the shaft due to heat being set to an installation point of the first auxiliary bearing, it is possible to make the distance between the stopper and the auxiliary bearing not dependent on the amount of extension of the shaft. Consequently, according to the present invention, in a centrifugal compressor including an auxiliary bearing which supports a shaft, which is supported by a magnetic bearing, when the shaft is displaced from a reference position, it is possible to securely restrict a movement of the shaft in the axial direction when the shaft is supported by the auxiliary bearing and to prevent a contact between the stopper and the auxiliary bearing

DESCRIPTION OF EMBODIMENTS

Hereunder is a description of an embodiment of a centrifugal compressor according to the present invention with reference to the drawings. In the drawings described below, the scale of each component has been suitably altered in order to make each component of a recognizable size. Note that the centrifugal compressor described below is a two-stage serial compressor. However, the centrifugal compressor of the present invention is not limited to a two-stage serial compressor, but includes a single-stage compressor, a turbocharger with a structure of a centrifugal compressor, and the like.

Figure 1:
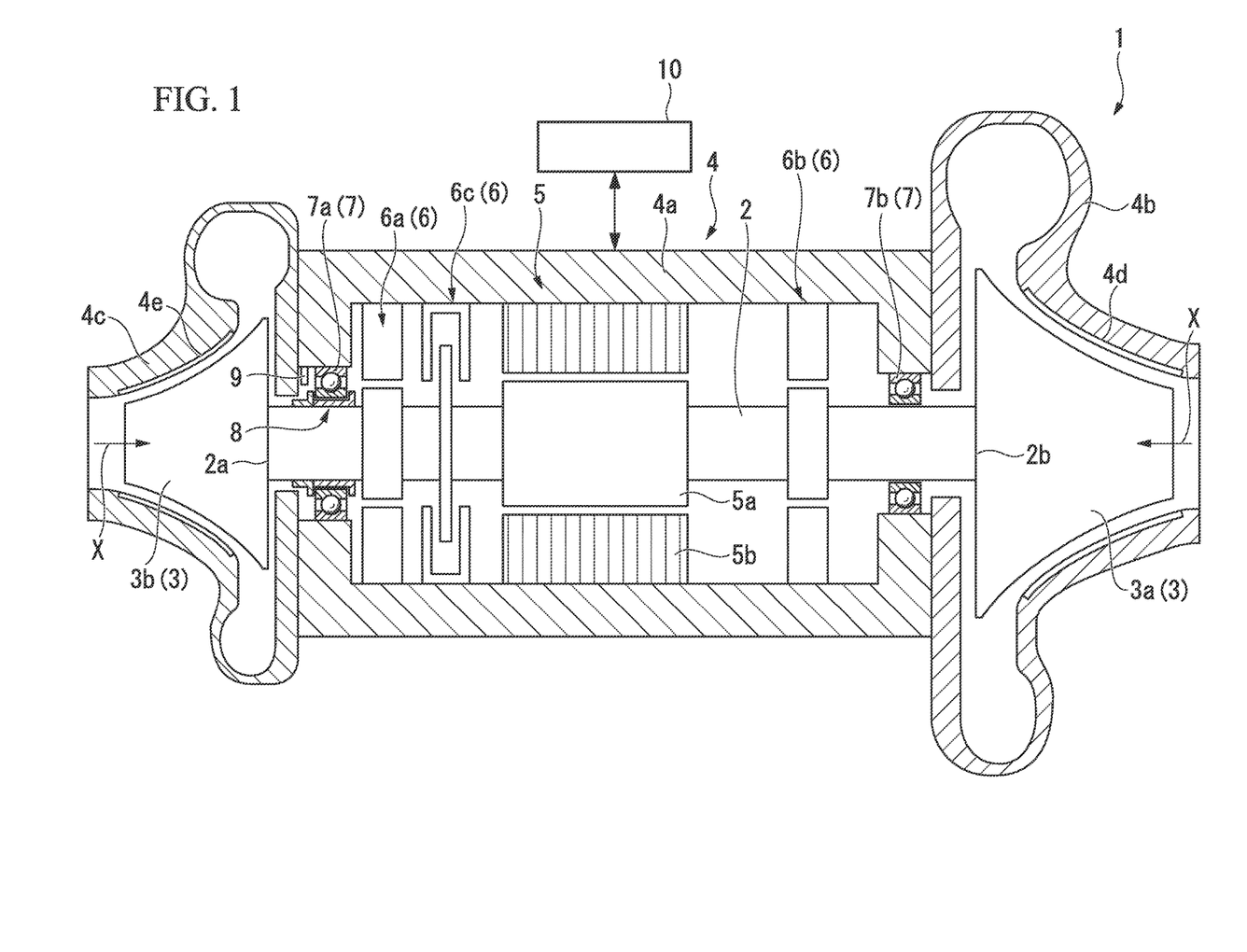
FIG. 1 is a longitudinal cross-sectional view showing a schematic structure of a centrifugal compressor according to an embodiment of the present invention.

FIG. 1 is a longitudinal cross-sectional view showing a schematic structure of a centrifugal compressor 1 of the present embodiment. As shown in FIG. 1, the centrifugal compressor 1 of the present embodiment includes: a shaft 2; impellers 3; a housing 4; a motor 5; magnetic bearings 6; auxiliary bearings 7; a stopper 8; a sensor 9; and a control unit 10.

The shaft 2 is a rod-like member made of a cylindrical metal material. As shown in FIG. 1, the shaft 2 is arranged with its axial direction being horizontally oriented. In the present embodiment, the axial direction of the shaft 2 is in the horizontal direction. However, the present invention is not limited to this. Furthermore, a high-pressure impeller 3b (described later) is fixed to a first end 2a (left end in FIG. 1) of the shaft 2. A low-pressure impeller 3a (described later) is fixed to a second end 2b (right end in FIG. 1) of the shaft 2.

This shaft 2 transmits rotative power generated by the motor 5 to the low-pressure impeller 3a and to the high-pressure impeller 3b. During normal operation of the centrifugal compressor 1, the shaft 2 is rotatably supported about its axis by the magnetic bearings 6. When the centrifugal compressor 1 is at rest or in an emergency such as a power failure or an earthquake, the shaft 2 is supported by the auxiliary bearings 7.

The impellers 3 are radial impellers that are fixed to the ends of the shaft 2 and that, when rotated together with the shaft 2, impart velocity energy to air X (gas) taken in the impellers 3 along the axial direction. In the present embodiment, the low-pressure impeller 3a and the high-pressure impeller 3b are installed as the impellers 3. As described above, the low-pressure impeller 3a is fixed to the second end 2b of the shaft 2. The low-pressure impeller 3a imparts velocity energy to the air X taken in from the outside. As described above, the high-pressure impeller 3b is fixed to the first end 2a of the shaft 2. The high-pressure impeller 3b imparts further velocity energy to the air X, which has been decreased in speed and increased in pressure after the impartation of the velocity energy by the low-pressure impeller 3a. Namely, the high-pressure impeller 3b is used to further compress the air X that has been compressed by use of the low-pressure impeller 3a. In the present embodiment, the gas as a compression target of the present invention is described as the air X. However, the present invention is not limited to this.

The housing 4 is a container for containing the shaft 2 and the impellers 3. The housing 4 is made of: a shaft housing 4a that contains, in addition to the shaft 2, the motor 5, the magnetic bearings 6, the auxiliary bearings 7, the stopper 8, and the sensor 9; a low-pressure impeller housing 4b that contains the low-pressure impeller 3a; and a high-pressure impeller housing 4c that contains the high-pressure impeller 3b. In the interior sections of the low-pressure impeller housing 4b and the high-pressure impeller housing 4c, flow passages through which the air X flows are formed. Although omitted in FIG. 1, there is provided a connection pipe that connects the flow passage in the low-pressure impeller housing 4b and the flow passage in the high-pressure impeller housing 4c. The air X compressed by use of the low-pressure impeller 3a is guided to the high-pressure impeller 3b via this connection pipe.

In the interior section of the low-pressure impeller housing 4b, there is installed a shroud 4d for adjusting a gap between the low-pressure impeller housing 4b and a tip of the low-pressure impeller 3a. In the interior section of the high-pressure impeller housing 4c, there is installed a shroud 4e for adjusting a gap between the high-pressure impeller housing 4c and a tip of the high-pressure impeller 3b.

As shown in FIG. 1, the motor 5 is arranged at the center of the shaft housing 4a. A rotor 5a of the motor 5 is fixed to the shaft 2. A stator 5b of the motor 5 is fixed to the shaft housing 4a. The rotor 5a and the stator 5b are arranged in a non-contact manner with a predetermined gap therebetween. With electric power being supplied from a power source unit (not shown in the figures) under control of the control unit 10, this motor 5 generates rotative power for rotating the shaft 2.

The magnetic bearings 6 are contained in the interior section of the shaft housing 4a, and rotatably support the shaft 2 in a non-contact manner with a magnetic force. In the present embodiment, as the magnetic bearings 6, a first radial magnetic bearing 6a, a second radial magnetic bearing 6b, and an axial magnetic bearing 6c are installed. The first radial magnetic bearing 6a is arranged closer to the first end 2a of the shaft 2 than the center of the shaft 2 in the axial direction of the shaft 2. The second radial magnetic bearing 6b is arranged closer to the second end 2b of the shaft 2 than the center of the shaft 2 in the axial direction of the shaft 2. With electric power being supplied from the power source unit (not shown in the figures) under control of the control unit 10, the first radial magnetic bearing 6a and the second radial magnetic bearing 6b generate magnetic forces that restrict the position of the shaft 2 in the radial direction. The axial magnetic bearing 6c is provided between the motor 5 and the first radial magnetic bearing 6a in the axial direction of the shaft 2. This axial magnetic bearing 6c is arranged on a side of a first auxiliary bearing 7a (described later) in the axial direction of the shaft 2. With electric power being supplied from the power source unit (not shown in the figures) under control of the control unit 10, this axial magnetic bearing 6c generates a magnetic force that restricts the position of the shaft 2 in the axial direction.

The auxiliary bearings 7 are contained in the interior section of the shaft housing 4a. When, due to a power failure, an earthquake, or the like, the shaft 2 is displaced from a position (a reference position) where the shaft 2 is originally supported by the magnetic bearings 6, the auxiliary bearings 7 support the shaft 2. In the present embodiment, as the auxiliary bearings 7, a first auxiliary bearing 7a and a second auxiliary bearing 7b are installed.

The first auxiliary bearing 7a is arranged closer to the first end 2a than the first radial magnetic bearing 6a in the axial direction of the shaft 2. In the present embodiment, a deep groove ball bearing is used as the first auxiliary bearing 7a. An outer ring of this first auxiliary bearing 7a is fixed to the shaft housing 4a, and an inner ring of this first auxiliary bearing 7a is arranged so as to face the stopper 8, which is fixed onto the shaft 2, with a slight gap therebetween. The second auxiliary bearing 7b is arranged closer to the second end 2b than the second radial magnetic bearing 6b in the axial direction of the shaft 2. In the present embodiment, similarly to the case of the first auxiliary bearing 7a, a deep groove ball bearing is used as the second auxiliary bearing 7b. Namely, in the present embodiment, the first auxiliary bearing 7a as well as the second auxiliary bearing 7b is a deep groove ball bearing. An outer ring of this second auxiliary bearing 7b is fixed to the shaft housing 4a, and an inner ring of this second auxiliary bearing 7b is arranged so as to face a circumferential surface of the shaft 2 with a slight gap therebetween.

Figure 2A:
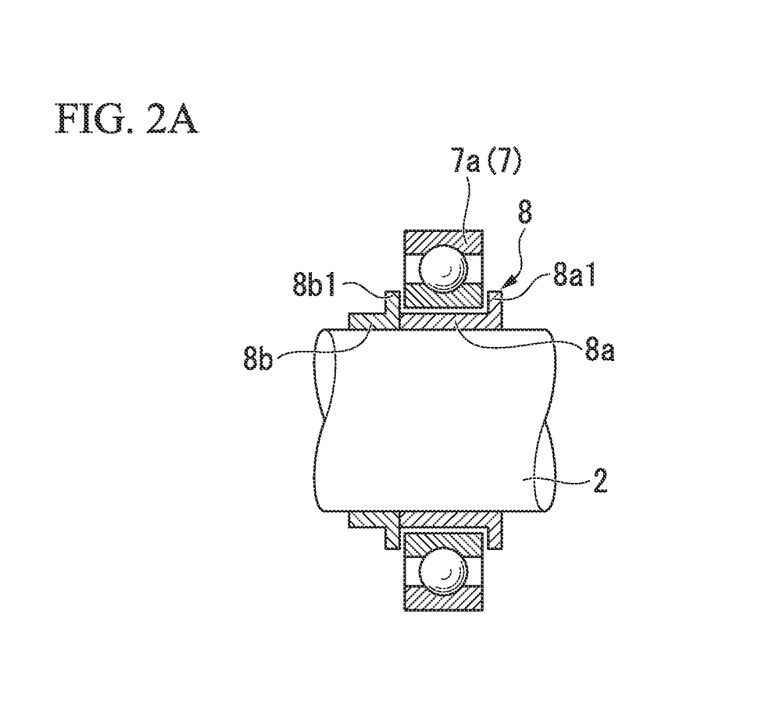
FIG. 2A is an enlarged view of a part including a stopper provided to the centrifugal compressor according to the embodiment of the present invention.
Figure 2B:
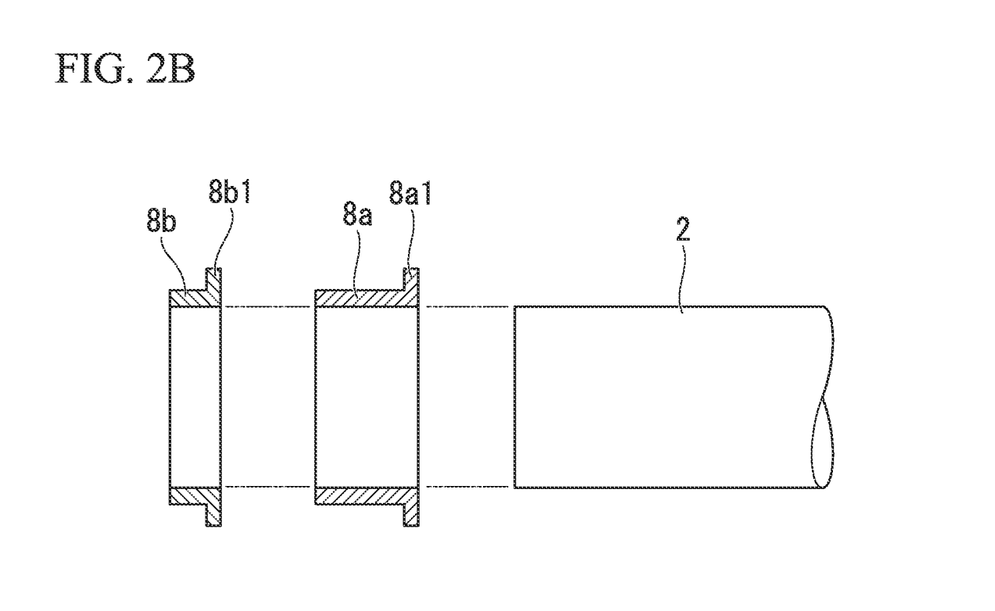
FIG. 2B is an exploded view of a shaft and a stopper provided to the centrifugal compressor according to the embodiment of the present invention.

Subsequently, the stopper 8 will be described with reference to FIG. 2A and FIG. 2B. FIG. 2A is an enlarged view of a part including the stopper 8, in which the housing 4 is omitted. FIG. 2B is an exploded view of the shaft 2 and the stopper 8. As shown in these figures, the stopper 8 is made of a first ring member 8a and a second ring member 8b. The first ring member 8a is a ring member having at its center a through-hole through which the shaft 2 is inserted, and is fitted onto the shaft 2 by, for example, shrink fitting. As shown in FIG. 2A and FIG. 2B, this first ring member 8a has a first protrusion 8a1. This first protrusion 8a1 is provided at a far end of the first ring member 8a when seen from the first end 2a side (left side in FIG. 2A and FIG. 2B), and is arranged so that the first protrusion 8a1 faces a side surface of the first auxiliary bearing 7a with a slight gap therebetween. The second ring member 8b is a ring member having at its center a through-hole through which the shaft 2 is inserted, and similarly to the first ring member 8a, is fitted onto the shaft 2 by, for example, shrink fitting. This second ring member 8b is arranged closer to the first end 2a than the first ring member 8a, and contacts with the first ring member 8a. As shown in FIG. 2A and FIG. 2B, the second ring member 8b has a second protrusion 8b1. This second protrusion 8b1 is provided at a far end of the second ring member 8b when seen from the first end 2a, and is arranged so that the second protrusion 8b1 faces an opposite side surface of the first auxiliary bearing 7a, which is a side surface opposite to the side surface that faces the first protrusion 8a1, with a slight gap therebetween. Namely, with the first ring member 8a and the second ring member 8b being arranged in contact with each other, a groove section extending in a circumferential direction of the shaft 2 and the stopper 8 is formed between the first protrusion 8a1 and the second protrusion 8b1, and the first auxiliary bearing 7a is arranged so as to fit into this groove section, as shown in FIG. 2A.

With the first protrusion 8a1 and the second protrusion 8b1, which are arranged so as to sandwich the first auxiliary bearing 7a in the axial direction of the shaft 2 with a slight gap therebetween, this stopper 8 restricts a movement of the shaft 2 in the axial direction in an emergency such as a power failure or an earthquake. For example, if the shaft 2 is to move from the first end 2a side to the second end 2b side when the shaft 2 is supported by the auxiliary bearings 7, then the second protrusion 8b1 is brought into contact with the first auxiliary bearing 7a, to thereby restrict the movement of the shaft 2. On the other hand, if the shaft 2 is to move from the second end 2b side to the first end 2a side when the shaft 2 is supported by the auxiliary bearings 7, then the first protrusion 8a1 is brought into contact with the first auxiliary bearing 7a, to thereby restrict the movement of the shaft 2.

Returning to FIG. 1, the sensor 9 is arranged between the first auxiliary bearing 7a and the high-pressure impeller housing 4c, and is fixed to the shaft housing 4a. This sensor 9 detects a position of the shaft 2 in the axial direction. As the sensor 9, a variety of sensors may be used. For example, a heat-resistant eddy-current sensor, a heat-resistant fiber sensor, or the like may be used. The sensor 9 is used for adjusting the position of the shaft 2 in the axial direction during normal operation with the shaft 2 being supported by the magnetic bearings 6. This sensor 9 is electrically connected to the control unit 10, and outputs a signal indicating the position of the shaft 2 in the axial direction to the control unit 10.

In the present embodiment, a base point of thermal extension and contraction of the shaft 2 (a position that is not moved by thermal extension and contraction) is set to a position at which the first auxiliary bearing 7a is arranged. The sensor 9 is installed at a position as close as possible to the base point of thermal extension and contraction of the shaft 2.

The control unit 10 controls overall operations of the centrifugal compressor 1 of the present embodiment. In the present embodiment, based on a signal that is input from the sensor 9, the control unit 10 controls the axial magnetic bearing 6c so that the base point for the shaft 2 to be extended and contracted thermally corresponds to a position where the first auxiliary bearing 7a is arranged, to thereby control the position of the shaft 2 in the axial direction. Namely, the control unit 10 controls the axial magnetic bearing 6c so that the position at which the first auxiliary bearing 7a is arranged (i.e., the region between the first protrusion 8a1 and the second protrusion 8b1) does not move horizontally, to thereby adjust the position of the shaft 2 in the axial direction. As a result, in appearance, the shaft 2 is thermally extended and contracted with the position at which the first auxiliary bearing 7a is arranged (i.e., the region between the first protrusion 8a1 and the second protrusion 8b1) being at the base point.

In the centrifugal compressor 1 of the present invention with this structure, under control of the control unit 10, the shaft 2 is supported at the reference position by the magnetic bearings 6 in a non-contact manner, and is rotated by the motor 5. As the shaft 2 is rotated in this manner, the low-pressure impeller 3a and the high-pressure impeller 3b are rotated.

To the air X taken into the low-pressure impeller housing 4b from the outside, velocity energy is imparted by the low-pressure impeller 3a, and then the air X is decreased in speed in the low-pressure impeller housing 4b, and thereby, the air X is increased in pressure. The air X whose pressure is increased in the low-pressure impeller housing 4b is taken into the high-pressure impeller housing 4c. To the air X taken into the high-pressure impeller housing 4c, velocity energy is imparted by the high-pressure impeller 3b, and then the air X is decreased in speed in the high-pressure impeller housing 4c, and thereby, the air X is increased in pressure. Thus, the air X is compressed in two stages by use of the low-pressure impeller 3a and the high-pressure impeller 3b.

In the case where the magnetic bearings 6 cease to operate due to a power failure or when an external vibration is imparted due to an earthquake, the shaft 2 is displaced from the reference position, which is the original position of the shaft 2. At this time, in the centrifugal compressor 1 of the present embodiment, the shaft 2 is brought into contact with the auxiliary bearings 7, and hence, is supported by the auxiliary bearings 7. This prevents the shaft 2 from being brought into contact with members other than the auxiliary bearings 7.

Subsequently, the operations and the effects of the centrifugal compressor 1 of the present embodiment as described above will be described.

The centrifugal compressor 1 of the present embodiment includes the stopper 8 that is provided only for the first auxiliary bearing 7a among the first auxiliary bearing 7a and the second auxiliary bearing 7b. The stopper 8 is fixed to the shaft 2, and restricts the movement of the shaft 2 in both directions in the axial direction when the stopper 8 is brought into contact with the first auxiliary bearing 7a. Namely, in the centrifugal compressor 1 of the present embodiment, a stopper that is brought into contact with the second auxiliary bearing 7b is not provided. Therefore, with the position of the shaft 2 in the axial direction being adjusted by the axial magnetic bearing 6c so that the base point of thermal extension and contraction of the shaft 2 is set to the installation site of the first auxiliary bearing 7a, it is possible to make a distance from the stopper 8 to the first auxiliary bearing 7a constant and also to prevent the stopper 8 from being brought into contact with the first auxiliary bearing 7a and the second auxiliary bearing 7b, even if the shaft 2 is thermally extended or contracted. Consequently, according to the centrifugal compressor 1 of the present embodiment, it is possible to securely restrict the movement of the shaft 2 in the axial direction when the shaft 2 is supported by the auxiliary bearings 7, and also to prevent the contact between the stopper 8 and the auxiliary bearings 7 when the magnetic bearings 6 are operating normally.

In the centrifugal compressor 1 of the present embodiment, the axial magnetic bearing 6c is located at a position closer to the first auxiliary bearing 7a than the second auxiliary bearing 7b in the axial direction of the shaft 2. The axial magnetic bearing 6c adjusts the position of the shaft 2 in the axial direction. Namely, in the centrifugal compressor 1 of the present embodiment, the axial magnetic bearing 6c is arranged near the base point of thermal extension and contraction of the shaft 2. Therefore, compared with the case where the axial magnetic bearing 6c is installed far from the base point of thermal extension and contraction of the shaft 2, an amount of movement of the shaft 2, at the installation site of the axial magnetic bearing 6c, due to thermal extension and contraction of the shaft 2 is small, making it possible to easily adjust the position.

In the centrifugal compressor 1 of the present embodiment, the high-pressure impeller 3b is fixed to the first end 2a of the shaft 2, which is an end on the side on which the stopper 8 is arranged. Namely, in the present embodiment, the stopper 8 and the first auxiliary bearing 7a are installed on the side of the high-pressure impeller 3b in the axial direction of the shaft 2. As a result, it is possible to decrease the distance from the base point of thermal extension and contraction to the high-pressure impeller 3b, and to keep small the amount of displacement of the high-pressure impeller 3b caused by the thermal extension and contraction of the shaft 2. As for the performance of the centrifugal compressor 1, higher accuracy is required for a clearance between the high-pressure impeller 3b and the shroud 4e than a clearance between the low-pressure impeller 3a and the shroud 4d. Thus, with the amount of displacement of the high-pressure impeller 3b being kept small, it is possible to satisfy the above-mentioned requirement for accuracy with ease.

In the centrifugal compressor 1 of the present embodiment, the first auxiliary bearing 7a is formed of a deep groove ball bearing. Because the deep groove ball bearing is capable of supporting a load in the axial direction, it is possible to securely restrict a movement of the shaft 2 when the shaft 2 is to move in the axial direction. Furthermore, as a deep groove ball bearing is used for the second auxiliary bearing 7b similarly to the case of the first auxiliary bearing 7a, it is possible to achieve commonality of components by using the same components for the first auxiliary bearing 7a and the second auxiliary bearing 7b, to thereby reduce the manufacturing costs.

Figure 3A:
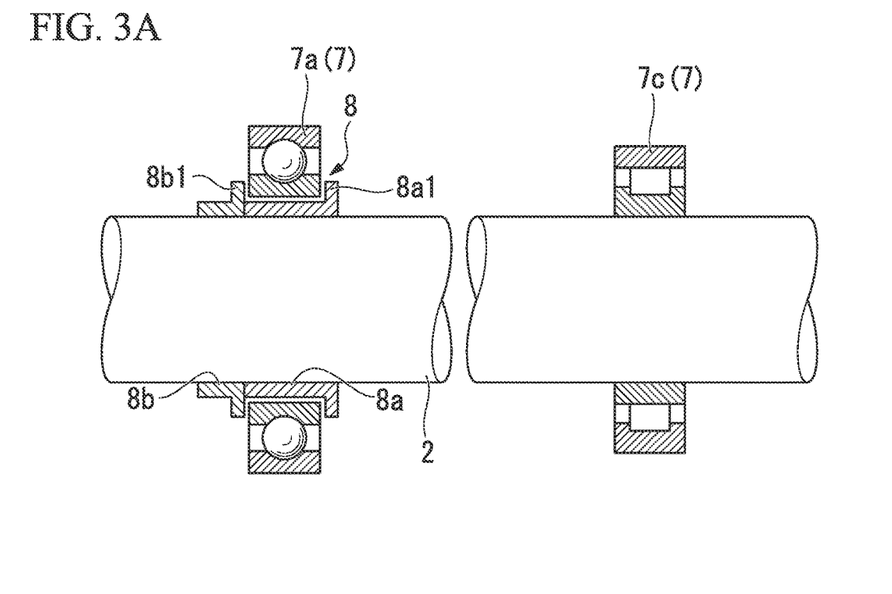
FIG. 3A is a partially enlarged view showing a modification of a centrifugal compressor, which has a second auxiliary bearing formed of a roller bearing, according to the embodiment of the present invention.
Figure 3B:
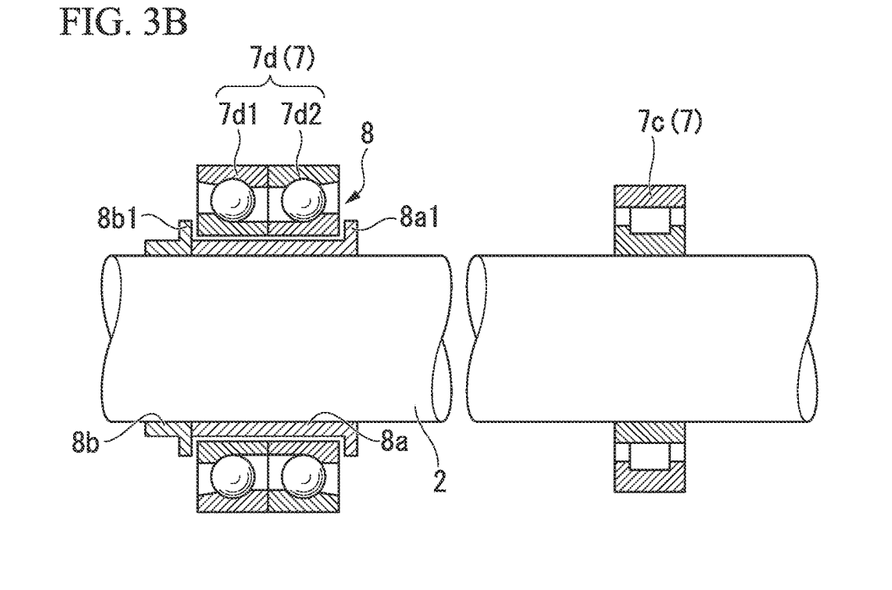
FIG. 3B is a partially enlarged view showing a modification of a centrifugal compressor, which has: a first auxiliary bearing formed of a double-row angular ball bearing; and a second auxiliary bearing formed of a roller bearing, according to the embodiment of the present invention.

However, in the present invention, using the same deep groove ball bearings for the first auxiliary bearing 7a and the second auxiliary bearing 7b is not required. For example, in the present invention, the second auxiliary bearing 7b does not receive a load in the axial direction. Therefore, as shown in FIG. 3A, there may be installed a second auxiliary bearing 7c (auxiliary bearing 7) formed of a roller bearing. As the second auxiliary bearing 7c formed of a roller bearing is installed, it is possible to support a load in a radial direction heavier than that of the case of the deep groove ball bearing. Furthermore, as shown in FIG. 3B, instead of the first auxiliary bearing 7a, a first auxiliary bearing 7d (auxiliary bearing 7) formed of a double-row angular ball bearing may be installed, in which two of an angular ball bearing 7d1 and an angular ball bearing 7d2 are installed so that the back surfaces of these two face each other. This first auxiliary bearing 7d is capable of supporting the load of the shaft 2 in the axial direction and is also capable of supporting a heavy load in the radial direction. Therefore, as shown in FIG. 3B, as the first auxiliary bearing 7d formed of a double-row angular ball bearing, and the second auxiliary bearing 7c formed of a roller bearing are provided, it is possible to increase a load carrying capability of the auxiliary bearing 7.

Note that the two of the angular ball bearing 7d1 and the angular ball bearing 7d2 may be installed so that the front surfaces of these two face each other.

In the centrifugal compressor 1 of the present embodiment, the stopper 8 is made of: the first ring member 8a that has the first protrusion 8a1, which is arranged so as to face the side surface of the first auxiliary bearing 7a on the second end 2b side, and that is fitted onto the shaft 2; and the second ring member 8b that has the second protrusion 8b1, which is arranged so as to face the side surface of the first auxiliary bearing 7a on the first end 2a side, and that is fitted onto the shaft 2. Therefore, with the first ring member 8a and the second ring member 8b being fixed to the shaft 2 by shrink fitting or the like, it is possible to arrange the first protrusion 8a1 and the second protrusion 8b1 on both sides of the first auxiliary bearing 7a.

While a preferred embodiment of the present invention has been described with reference to the appended drawings, it is obvious that the present invention is not limited to the aforementioned embodiment. Shapes, combinations, and the like of the constituent elements shown in the aforementioned embodiment is only exemplary, and various modifications can be made based on design requirements or the like without departing from the spirit or scope of the present invention.

For example, a groove or the like for locking a puller may be formed in the first ring member 8a and the second ring member 8b of the above-mentioned embodiment. As a result, even if the necessity of pulling out the shaft 2 from the housing 4 arises at the time of maintenance or the like, it is possible to easily remove the first ring member 8a and the second ring member 8b from the shaft 2, thus making the operation of pulling out the shaft 2 easy.

INDUSTRIAL APPLICABILITY

In a centrifugal compressor including an auxiliary bearing for supporting a shaft, which is supported by a magnetic bearing, when the shaft is displaced from a reference position, it is possible to securely restrict a movement of the shaft in the axial direction when the shaft is supported by the auxiliary bearing and to prevent a contact between a stopper and the auxiliary bearing when the magnetic bearing is operating normally.

REFERENCE SIGNS LIST

1: centrifugal compressor
2: shaft
2a: first end
2b: second end
3: impeller
3a: low-pressure impeller
3b: high-pressure impeller
4: housing
4a: shaft housing
4b: low-pressure impeller housing
4c: high-pressure impeller housing
4d, 4e: shroud
5: motor
5a: rotor
5b: stator
6: magnetic bearing
6a: first radial magnetic bearing
6b: second radial magnetic bearing
6c: axial magnetic bearing
7: auxiliary bearing 7a, 7d: first auxiliary bearing
7b, 7c: second auxiliary bearing
7d1, 7d2: angular contact ball bearing
8: stopper
8a: first ring member
8a1: first protrusion
8b: second ring member
8b1: second protrusion
9: sensor
10: control unit
X: air (gas)

The invention claimed is:

1. A centrifugal compressor that includes: a shaft that is rotatably supported by a magnetic bearing; an impeller that is fixed to the shaft; and an auxiliary bearing that supports the shaft when the shaft is displaced from a reference position, the centrifugal compressor further comprising:
the impeller has: a low-pressure impeller; and a high-pressure impeller that further compresses gas compressed by the low-pressure impeller; and
the high-pressure impeller is fixed to a first end of the shaft, which is an end of the side on which the stopper is arranged;
a first auxiliary bearing, as the auxiliary bearing, which is arranged on a side of a first end of the shaft;
a second auxiliary bearing, as the auxiliary bearing, which is arranged on a side of a second end of the shaft; and
a stopper that is provided only for the first auxiliary bearing among the first auxiliary bearing and the second auxiliary bearing, that is fixed to the shaft, and that restricts a movement of the shaft in both directions in an axial direction of the shaft by the stopper being brought into contact with the first auxiliary bearing
wherein a base point of thermal extension and contraction of the shaft is set to a position at which the first auxiliary bearing is arranged.

2. The centrifugal compressor according to claim 1, wherein the magnetic bearing has an axial magnetic bearing that restricts a movement of the shaft in the axial direction of the shaft, the axial magnetic bearing being arranged at a position closer to the first auxiliary bearing than the second auxiliary bearing in the axial direction of the shaft.

3. The centrifugal compressor according to claim 1, wherein each of the first auxiliary bearing and the second auxiliary bearing is a deep groove ball bearing.

4. The centrifugal compressor according to claim 1, wherein the stopper has:
a first ring member that has a first protrusion and is fitted onto the shaft, the first protrusion being arranged so as to face a side surface of the first auxiliary bearing on the side of the second end; and
a second ring member that has a second protrusion and is fitted onto the shaft, the second protrusion being arranged so as to face a side surface of the first auxiliary bearing on the side of the first end.

5. A centrifugal compressor that includes: a shaft that is rotatably supported by a magnetic bearing; an impeller that is fixed to the shaft; and an auxiliary bearing that supports the shaft when the shaft is displaced from a reference position, the centrifugal compressor further comprising:
the impeller has: a low-pressure impeller; and a high-pressure impeller that further compresses gas compressed by the low-pressure impeller; and
the high-pressure impeller is fixed to the first end of the shaft, which is an end of the side on which the stopper is arranged;
a first auxiliary bearing, as the auxiliary bearing, which is arranged on a side of a first end of the shaft;
wherein the first auxiliary bearing is a double-row angular ball bearing that is made of two angular ball bearings arranged so that back surfaces or front surfaces of the two angular ball bearings face each other, and the second auxiliary bearing is a roller bearing;
a second auxiliary bearing, as the auxiliary bearing, which is arranged on a side of a second end of the shaft; and
a stopper that is provided only for the first auxiliary bearing among the first auxiliary bearing and the second auxiliary bearing, that is fixed to the shaft, and that restricts a movement of the shaft in both directions in an axial direction of the shaft by the stopper being brought into contact with the first auxiliary bearing;
wherein a base point of thermal extension and contraction of the shaft is set to a position at which the first auxiliary bearing is arranged.

* * * * *